United States Patent
Minear et al.

(10) Patent No.: US 8,290,305 B2
(45) Date of Patent: Oct. 16, 2012

(54) REGISTRATION OF 3D POINT CLOUD DATA TO 2D ELECTRO-OPTICAL IMAGE DATA

(75) Inventors: Kathleen Minear, Palm Bay, FL (US); Anthony O'Neil Smith, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 855 days.

(21) Appl. No.: 12/371,436

(22) Filed: Feb. 13, 2009

(65) Prior Publication Data

US 2010/0209013 A1    Aug. 19, 2010

(51) Int. Cl.
*G06K 9/32*    (2006.01)
(52) U.S. Cl. .......... 382/294; 345/629; 348/580; 700/57
(58) Field of Classification Search .................. 382/100, 382/103, 106, 154, 293, 294, 295; 345/619–689; 348/580, 584; 700/57
See application file for complete search history.

(56) References Cited

U.S. PATENT DOCUMENTS

| | | | |
|---|---|---|---|
| 5,247,587 A | 9/1993 | Hasegawa et al. | |
| 5,416,848 A | 5/1995 | Young | |
| 5,495,562 A * | 2/1996 | Denney et al. ................. | 345/421 |
| 5,742,294 A * | 4/1998 | Watanabe et al. ............. | 345/672 |
| 5,781,146 A | 7/1998 | Frederick | |
| 5,875,108 A | 2/1999 | Hoffberg et al. | |
| 5,901,246 A | 5/1999 | Hoffberg et al. | |
| 5,988,862 A | 11/1999 | Kacyra et al. | |
| 5,999,650 A | 12/1999 | Ligon | |
| 6,081,750 A | 6/2000 | Hoffberg et al. | |
| 6,206,691 B1 | 3/2001 | Lehmann et al. | |
| 6,246,468 B1 | 6/2001 | Dimsdale | |

(Continued)

FOREIGN PATENT DOCUMENTS

DE    197 46 639    5/1999

(Continued)

OTHER PUBLICATIONS

Cyr, et al., "2D-3D Registration Based on Shape Matching", Mathematical Methods in Biomedical Image Analysis, 2000.

(Continued)

*Primary Examiner* — Anand Bhatnagar
(74) *Attorney, Agent, or Firm* — Fox Rothschild, LLP; Robert J. Sacco

(57) ABSTRACT

Method and system for registration of a two dimensional image data set and a three-dimensional image comprising point cloud data. The method begins by cropping a three-dimensional volume of point cloud data comprising a three-dimensional image data to remove a portion of the point cloud data comprising a ground surface within a scene, and dividing the three-dimensional volume into a plurality of m sub-volumes. Thereafter, the method continues by edge-enhancing a two-dimensional image data. Then, for each qualifying sub-volume, creating a filtered density image, calculating a two-dimensional correlation surface based on the filtered density image and the two-dimensional image data that has been edge enhanced, finding a peak of the two-dimensional correlation surface, determining a corresponding location of the peak within the two-dimensional image, defining a correspondence point set; and storing the correspondence point set in a point set list. Finally, a transformation is determined that minimizes the error between a plurality of the correspondence point sets contained in the point set list.

21 Claims, 8 Drawing Sheets

U.S. PATENT DOCUMENTS

| | | | |
|---|---|---|---|
| 6,271,860 | B1 | 8/2001 | Gross |
| 6,330,523 | B1 | 12/2001 | Kacyra et al. |
| 6,400,996 | B1 | 6/2002 | Hoffberg et al. |
| 6,405,132 | B1 | 6/2002 | Breed et al. |
| 6,418,424 | B1 | 7/2002 | Hoffberg et al. |
| 6,420,698 | B1 | 7/2002 | Dimsdale |
| 6,448,968 | B1 * | 9/2002 | Pfister et al. ............... 345/423 |
| 6,473,079 | B1 | 10/2002 | Kacyra et al. |
| 6,476,803 | B1 | 11/2002 | Zhang et al. |
| 6,512,518 | B2 * | 1/2003 | Dimsdale ............... 345/427 |
| 6,512,993 | B2 | 1/2003 | Kacyra et al. |
| 6,526,352 | B1 | 2/2003 | Breed et al. |
| 6,782,312 | B2 | 8/2004 | He |
| 6,792,136 | B1 | 9/2004 | Niesen |
| 6,839,632 | B2 | 1/2005 | Grace |
| 6,904,163 | B1 | 6/2005 | Fujimura et al. |
| 6,980,224 | B2 | 12/2005 | Wiant, Jr. |
| 6,987,878 | B2 * | 1/2006 | Lees et al. ............... 382/154 |
| 7,015,931 | B1 | 3/2006 | Cieplinski |
| 7,046,841 | B1 | 5/2006 | Dow et al. |
| 7,098,809 | B2 | 8/2006 | Feyereisen et al. |
| 7,130,490 | B2 | 10/2006 | Elder et al. |
| 7,187,452 | B2 * | 3/2007 | Jupp et al. ............... 356/501 |
| 7,206,462 | B1 | 4/2007 | Betke et al. |
| 7,242,460 | B2 | 7/2007 | Hsu et al. |
| 7,477,360 | B2 | 1/2009 | England et al. |
| 7,647,087 | B2 | 1/2010 | Miga et al. |
| 7,777,761 | B2 | 8/2010 | England et al. |
| 7,804,498 | B1 | 9/2010 | Graham et al. |
| 7,831,087 | B2 | 11/2010 | Harville |
| 7,940,279 | B2 * | 5/2011 | Pack ............... 345/582 |
| 7,974,461 | B2 | 7/2011 | England et al. |
| 7,990,397 | B2 | 8/2011 | Bukowski et al. |
| 7,995,057 | B2 * | 8/2011 | Chuter ............... 345/424 |
| 8,045,762 | B2 | 10/2011 | Otani et al. |
| 2002/0059042 | A1 | 5/2002 | Kacyra et al. |
| 2002/0145607 | A1 | 10/2002 | Dimsdale |
| 2002/0149585 | A1 | 10/2002 | Kacyra et al. |
| 2002/0158870 | A1 | 10/2002 | Brunkhart et al. |
| 2002/0176619 | A1 | 11/2002 | Love |
| 2003/0001835 | A1 | 1/2003 | Dimsdale et al. |
| 2004/0109608 | A1 | 6/2004 | Love et al. |
| 2004/0114800 | A1 | 6/2004 | Ponomarev et al. |
| 2005/0171456 | A1 | 8/2005 | Hirschman et al. |
| 2005/0243323 | A1 | 11/2005 | Hsu et al. |
| 2006/0061566 | A1 | 3/2006 | Verma et al. |
| 2006/0244746 | A1 | 11/2006 | England et al. |
| 2007/0081718 | A1 | 4/2007 | Rubbert et al. |
| 2007/0280528 | A1 | 12/2007 | Wellington et al. |
| 2008/0133554 | A1 | 6/2008 | Lee et al. |
| 2009/0097722 | A1 | 4/2009 | Dekel et al. |
| 2009/0161944 | A1 | 6/2009 | Lau et al. |
| 2009/0225073 | A1 | 9/2009 | Baker, III |
| 2009/0231327 | A1 | 9/2009 | Minear et al. |
| 2009/0232355 | A1 | 9/2009 | Minear et al. |
| 2009/0232388 | A1 | 9/2009 | Minear et al. |
| 2010/0020066 | A1 | 1/2010 | Dammann |
| 2010/0086220 | A1 | 4/2010 | Minear |
| 2010/0118053 | A1 | 5/2010 | Karp et al. |
| 2010/0207936 | A1 | 8/2010 | Minear et al. |
| 2010/0208981 | A1 | 8/2010 | Minear et al. |
| 2010/0209013 | A1 | 8/2010 | Minear et al. |
| 2011/0200249 | A1 | 8/2011 | Minear et al. |

FOREIGN PATENT DOCUMENTS

| | | |
|---|---|---|
| EP | 1 492 054 | 12/2004 |
| EP | 1 505 547 | 2/2005 |
| JP | 05-205072 A | 8/1993 |
| WO | 03 021533 A1 | 3/2003 |

OTHER PUBLICATIONS

Deng, et al. "Registration of Lidar and Optical Images Using Multiple Geometric Features", SPIE, Nov. 2007.

Huber, M., et al., "Fusion of LIDAR Data and Aerial Imagery for Automatic Reconstruction of Building Surfaces", pringed from the World Wide Web on May 19, 2009 at <http://www.sanborn.com/Pdfs/Article_Fusion_of_Lidar_Schickler.pdf>.

Liu, et al., "Automatic 3D to 2D Registration for the Photorealistic Rendering of Urban Scenes", Computer Vision and Pattern Recognition, 2005, CVPR 2005 vol. 2, pp. 137-143, vol. 2.

Schickler, W., et al., "Surface Estimation Based on Lidar", Published in: Proceeding of the ASPRS Annual Conference, St. Louis, Missouri, Apr. 2001.

Stamos, et al., "Automatic Registration of 2-D With 3-D Imagery in Urban Environments", year 2001.

Williams, et al., "Simultaneous Registration of Multiple Point Sets Using Orthonormal Matrices". IEEE pp. 2199-2202.

Zollei, et al., "2D-3D Rigid Registration of X-Ray Fluoroscopy and CT Images Using Mutual Information and Sparsely Sampled Histogram Estimators", 2001 IEEE Computer Society Conference on Computer Vision and Pattern Recognition (CVPR 2001), vol. 2, p. 696.

Rahmes, et al., U.S. Appl. No. 12/268,775, filed Nov. 11, 2008, entitled "Geospatial Modeling System for Images and Related Methods".

Minear, et al., U.S. Appl. No. 12/046,862, filed Mar. 12, 2008, entitled "Registration of 3D Point Cloud Data by Creation of Filtered Density Images".

Minear, et al., U.S. Appl. No. 12/047,066, filed Mar. 12, 2008, entitled "Registration of 3D Point Cloud Data Using Eigenanalysis".

Minear, et al., U.S. Appl. No. 12/046,880, filed Mar. 12, 2008, entitled, "Method for Visualization of Point Cloud Data".

Bergman, L.D., et al., "A Rule-Based Tool for Assisting Colormap Selection" Visualization, 1995, Visualization '95. Proceedings. IEEE Conference on Atlanta, GA USA Oct. 29-Nov. 3, 1995. Los Alamitos, CA, USA, IEEE Comput. Soc. US LNKD. pp. 118-125, 444.

Brenner, C., "Building Reconstruction From Images and Laser Scanning", International Journal of Applied Earth Observation and Geoinformation, Elsevier, LNKD-DOI: 10.1016/J.JAG.2004.10.006, vol. 6, No. 3-4, Mar. 1, 2005, pp. 187-198.

Gruen, A., et al., "Least Squares 3D surface and Curve Matching" ISPRS Journal of Photogrammerty and Remote Sensing, Amsterdam [U.A.] : Elsevier, vol. 59, No. 3, May 1, 2005, pp. 151-174.

Harris Corp., International Search Report mailed May 20, 2010, Application Serial No. PCT/US2010/023723.

Harris Corp., International Search Report mailed Jun. 4, 2010, Application Serial No. PCT/US2010/023738.

Matei, B.C., et al., "Building Segmentation for Densely Built Urban Regions Using Aerial LIDAR Data", Computer Vision and Pattern Recognition, 2008. CVPR 2008. IEEE Conference on, IEEE, Piscataway, NJ, USA, Jun. 23, 2008, pp. 1-8.

Kwang-Ho Bae, D. D. Lichti: "Automated Registration of Unorganised Point Clouds From Terrestrial Laser Scanners" International Archives of Photogrammetry and Remote Sensing, [Online] Jul. 12, 2004, XP002593550 Retrieved from the Internet: URL:http://www.isprs.org/proceedings/XXXV/congress/comm5/papers/553.pdf> [retrieved on Jul. 23, 2010] Section 1, Section 2 and subsections 2.1-2.4.

Bae K-H et al: "Pre-processing Procedures for Raw Point Clouds from Terrestrial Laser Scanners" Journal of Spatial Science, Spatial Sciences Institute, AU, vol. 52, No. 2, Dec. 1, 2007, pp. 65-74, XP008124682 ISSN: 1149-8596 the whole document.

Beinat et al., A direct method for the simultaneous and optimal multidimensional models registration, Nov. 8, 2001-Nov. 9, 2001, IEEE/ISPRS Joint Workshop 2001 Remote Sensing and Data Fusion over Urban Areas, pp. 283-287.

Demetrios Gatziolis: Precise FIA Plot Registration Using Fieldand Dense LIDAR Data Proceedings of the Eighth Annual Forest Inventory and Analysis Symposium, Oct. 16, 2006, pp. 243-249, XP002593551 * abstract; figures 2,3,; table 1 Sections "Introduction", "Data transcription to point patterns", "Point pattern matching".

In So Kweon et al: "High-Resolution Terrain Map From Multiple Sensor Data" IEEE Transactions on Pattern Analysis and Machine Intelligence, IEEE Service Center, Los Alamitos, CA, LNKD-DOI:10.1109/34.121795, vol. 14, No. 2, Feb. 1, 1992, pp. 278-292, XP000248484 ISSN: 0162-8828 * abstract Section III Local Terrain Matching.

Kim et al.,Lecture Notes in Computer Science 2004: An Improved ICP Algorithm Based on the Sensor Projection for Automatic 3D Registration, 2004, Springer, vol. 2972/2004, pp. 642-651.

Chen, Liant-Chien, et al., "Fusion of LIDAR Data and Optical Imagery for Building" [online] Retrieved from the Internet: citeseerx.ist.psu.edu/viewdoc/download?doi=10.1.1.129...—Similar <http://www.google.com/search?hl=en&biw=987&bih=584&q=related:citeseerx.ist.psu.edu/viewdoc/download%3Fdoi%3D10.1.1.129.2409%26rep%3Drep1%26type%3Dpdf+fusion+of+lidar+data+and+optical&tbo=1&sa=X&ei=mp4IToyaBpDAgQey46C-DQ&ved=0CCQQHzAA> [Jun. 25, 2011].

Harris Corp., International Search Report mailed Aug. 6, 2010, Application Serial No. PCT/US2006/035661.

Alshawa, ICL: Iterative closest line, Dec. 2007, Ekscentar, No. 10, pp. 53-59.

Nuchter, et al., 6D SLAM with an Application in Authnomous Mine Mapping, Apr. 26-May 1, 2004, Proceeding of the 2004 IEEE International Conference on Robotics an Automation, vol. 2, pp. 1998-2003.

Information about Related Patents and Patent Applications, see section 6 of the accompanying Information Disclosure Statement Letter, which concerns Related Patents and Patent Applications.

Wijk et al. "Enridged Contour Maps", 2001, VIS'01 Proceedings of the conference on Visualization '01, IEEE Computer Society Washington DC USA, p69-74.

Hengl, T. "Visualisation of uncertainty using the HSI colour model: Computations with colours." Sep. 2003, Proceedings of the 7th International Conference on GeoComputation, Southampton, United Kingdom, pp. CDROM, pp. 8-17.

Hyun "Nonlinear Color Scales for Interactive Exploration", 1991, (http://web.archive.org/web/20050921025757/http://www.caida.orghyoungh/colorscales/nonlinear.html).

Bourke "Colour Ramping for Data Visualisation", Jul. 1996 (http://web.archive.org/web/20060914040403/http://local.wasp.uwa.edu.auhpbourke/colour/colourramp).

Levkowitz et al. "Color Scales for Image Data", Jan. 1992, IEEE Computer Graphics & Applications, p72-80.

Goncalvez, J.A., "Orientation of Spot Stereopairs by means of Matching a Relative DEM and the SRTM DEM", International Calibration and Orientation Workshop Eurocow 2006, Jan. 25, 2006.

Postolov, Y., et al., "Registration of Airborne Laser Data to Surface Generated by Photogrammetric Means" International Archives of Photogrammetry and Remote Sensing, Nov. 9, 1999, pp. 95-99.

Roman, C., et al, "A Self-Consistent Bathymetric Mapping Algorithm" Journal of Field Robotics, Wiley, USA, vol. 24, No. 1-2; Jan. 2007, pp. 23-50.

Sofman, B., et al., "Terrain Classification from Aerial Data to Support Ground Vehicle Navigation" Internet Citation, Jan. 1, 2006, Retrieved from the Internet: URL:http://www.ri.cmu.edu/pub_files/pub4/sofman_boris_2006_1/sofman_boris_2006_1.pef>.

Lach, S. R., et al., Multisource Data Processing for Semi-Automated Radiometrically-Correct Scene Simulation: Urban Remote Sensing Joint Event, 2007, IEEE, PI LNKD Apr. 1, 2007, pp. 1-10.

Harris Corporation, International Patent Application No. PCT/US2010/023728, International Search Report mailed Aug. 4, 2010.

Orka, H.O., et al., "Classifying Species of Individual Trees by Intensity and Structure Features Derived from Airborne Laser Scanner Data", Remote Sensing of Environment, Elsevier, XX, vol. 113, No. 6, Jun. 15, 2009, pp. 1163-1174, XP026043484.

Deshmukh, K. S., et al., "An Adaptive Color Image Segmentation", Electronic Letters on Computer Vision and image Analysis, vol. 5, No. 4, Jan. 1, 2005, pp. 12-23, ISN: 1577-5097, Retrieved from the Internet: URL:http://elcvia.cvc.uab.es/index.php/elevia/article/viewArticle/115 [retrieved on Feb. 13, 2012].

Zheng, Y., et al., "Multisensory Data Exploitation Using Advanced Image Fusion and Adaptive Colorization", Proc. of SPIE, vol. 6968, Jan. 1, 2008, pp. 1-12, SP040437604.

European Search Report mailed Mar. 7, 2012, Application Serial No. 11001183.0-2218, in the name of Harris Corporation.

ArcGIS Desktop Help 9.1, (available complete URL: htto://webhelp.esri.com/arcgisdesktop/9.1/index.cfr?TopicName=welcome, last mofified May 1, 2007).

Richards, Janya. "Color Ramps Reogranized." ArcGIS Resource Center. ERSI, May 13, 2008. Web. Jun. 15, 2012. <htto://blogs.ersi.com/ersi/arcgis/2008/05/13/color-ramps/>.

Imhof, Eduard. Cartographic Relief Presentation. 1. Redlands: ERSI Press, 2007. 57-74. Print.

Hurni, Lorenz. "Cartographic Mountain Relief Presentation." 6th ICA Mountain Cartography Workshop Mountain Mapping and Visulaisation. (2008): 85-91. Print.

* cited by examiner

| Subregion No. | 2D Image | 3D Image |
|---|---|---|
| 1 | $x^1_{EO}, y^1_{EO}$ | $X^1_{Lidar}, Y^1_{Lidar}$ |
| 2 | $x^2_{EO}, y^2_{EO}$ | $X^2_{Lidar}, Y^2_{Lidar}$ |
| 3 | $x^3_{EO}, y^3_{EO}$ | $X^3_{Lidar}, Y^3_{Lidar}$ |
| ... | ... | ... |
| m | $x^m_{EO}, y^m_{EO}$ | $X^m_{Lidar}, Y^m_{Lidar}$ |

Location of peak $902_n$ corresponds with some point $x^*_{EO}, y^*_{EO}$ in the 2D image 500

$902_n$ $900_n$

Sensor Attitude

1102

REGISTRATION OF 3D POINT CLOUD DATA TO 2D ELECTRO-OPTICAL IMAGE DATA

BACKGROUND OF THE INVENTION

1. Statement of the Technical Field

The inventive arrangements concern image registration, and more particularly registration of two-dimensional image data acquired by electro-optical image sensors with three-dimensional point cloud image data acquired by LIDAR sensors.

2. Description of the Related Art

Imaging sensors are used in a wide variety of applications, including homeland security and military applications. For example, sensors of this type are commonly positioned on aircraft and earth-orbiting satellite platforms. Conventional electro-optical (EO) sensors have long been used for collection of such image data and generally produce two dimensional data. Such data generally corresponds to a projection of the image onto a planar field which can be entirely defined by an x and y coordinate axis.

More recently, there has been a growing interest in three-dimensional imaging data Those skilled in the art will appreciate that there are a variety of different types of sensors, measuring devices and imaging systems in existence which can be used to generate 3D point cloud data. One example of a 3D imaging system that generates one or more frames of 3D point cloud data is a conventional LIDAR imaging system. In general, such LIDAR systems use a high-energy laser, optical detector, and timing circuitry to determine the distance to a target. In a conventional LIDAR system one or more laser pulses is used to illuminate a scene. Each pulse triggers a timing circuit that operates in conjunction with the detector array. In general, the system measures the time for each pixel of a pulse of light to transit a round-trip path from the laser to the target and back to the detector array. The reflected light from a target is detected in the detector array and its round-trip travel time is measured to determine the distance to a point on the target. The calculated range or distance information is obtained for a multitude of points comprising the target, thereby creating a 3D point cloud. The 3D point cloud can be used to render the 3-D shape of an object.

Each point in the 3D point cloud is somewhat analogous to the pixel data generated by a digital camera, except that the 3D point data is arranged in three dimensions, with points defined at various locations by an x, y, and z coordinate axis system. The 3D image or cloud of points produced by the LIDAR sensor is commonly known as point cloud data. In contrast to 2D pixel data, the x,y,z coordinates provide only spatial information whereas the 2D pixels contain visual intensity information as a function of wavelength. It should be noted that some LIDAR sensors can simultaneously collect intensity data by long dwell times over a region of interest.

Point cloud data is useful for creating 3D models of a scene. However, it often lacks much of the detailed visual information normally associated with image data acquired using conventional EO sensors. Accordingly, it is advantageous to combine 2D EO imaging data with 3D point cloud data for the same scene. However, combining the two different sets of imaging data necessarily requires an image registration step. Such image registration step is usually aided by metadata associated with image. For example, such metadata can include 1) orientation and attitude information of the sensor and 2) latitude and longitude coordinates associated with the corner points of the image, and 3) in the case of point cloud data, the raw x, y, and z point locations for the point cloud data. This metadata can be used to determine the overlap region between the data sets as well as the correspondence point search reach area. Still, this image registration step can be difficult and time consuming because it requires precise alignment of the EO and LIDAR image data acquired by different sensors at different data collection times and different relative sensor positions. Moreover, the point cloud data is fundamentally different as compared to the EO image data, making for a more complex cross-sensor registration problem.

Various registration schemes have been proposed to solve the foregoing registration problem. For example, some registration schemes make use of a LIDAR intensity image as an aid in the registration process. The LIDAR intensity image is obtained by causing the LIDAR sensor to dwell on a scene for an extended period of time. Reflected intensity data is collected by the sensor during this period of time. This results in a 2D image data set obtained by the LIDAR sensor that is somewhat more analogous to the conventional image data collected by the EO sensor. The LIDAR intensity image can thereafter be used in various methods to facilitate the registration process Still, registration using a 2D LIDAR intensity image has many drawbacks. First, it only provides a 2D registration of the LIDAR data to the 2D EO image. Second, using this 2D LIDAR intensity image along with the raw 3D point cloud data and the 2D EO image can be processing intensive and involve a substantial amount of computer memory.

Other 2D to 3D registration techniques are also limited in the sense that they are primarily useful only with urban scenes (and require shape information) or scenes involving medical imagery (and require markers on the 2D image). Such systems also require a good initial guess of the alignment parameters associated with the registration.

SUMMARY OF THE INVENTION

The invention concerns a method and system for registration of two or more images. A two dimensional image data set and a three-dimensional image data set are obtained for a common scene. The three-dimensional volume of point cloud data and the two-dimensional image data is cropped to the region of overlap. A further cropping removes a portion of the point cloud data including a ground surface within the common scene. Thereafter, the three-dimensional volume is divided into m sub-volumes. The point cloud data within each sub-volume is projected to a registration plane perpendicular to the line-of-sight from the imaging sensor The two-dimensional image data is edge enhanced. Thereafter, for each qualifying sub-volume of 3D points, the following processing steps are performed: 1) qualifying subvolumes are each projected onto the registration plane, 2) a filtered density image is created from each subvolume, 3) the corresponding region is selected from the edge enhanced EO image, 4) a two-dimensional correlation surface (there are various ways to attain this surface: NCC, phase, phase-rho, mutual information) is calculated using the filtered density image and the corresponding 2D edge-enhanced EO image, 5) the maximum peak on the two-dimensional correlation surface is located, (this peak contains the displacement information between the images for a particular subregion), 6) the peak location on the correlation surface is referenced back to a location in each EO subregion, 7) the center location of each subregion of the filtered density image is referenced back to the center of the EO subregion, 8) for each subregion these two points form a pair of correspondence points, 9) an optimization routine finds the best fit between the correspondence point set. An example of 'm' correspondence points can be written as:

$$\{[(x_{Lidar}^1, y_{Lidar}^1)(x_{EO}^1, y_{EO}^1)], [(x_{Lidar}^2, y_{Lidar}^2)(x_{EO}^2, y_{EO}^2)], \ldots [(x_{Lidar}^m, y_{Lidar}^m)(x_{EO}^m, y_{EO}^m)]\}$$

A transformation between the correspondence points is determined by minimizing the distance between the points using an error or cost function. This transformation is then applied to all data points in the 3D point cloud data. The result is that the 3D LIDAR point cloud data set is aligned with the two-dimensional EO image data set. This process can be applied in the other direction that is, a transformation can be found which aligns the EO to the 3D LIDAR.

DETAILED DESCRIPTION OF THE PREFERRED EMBODIMENTS

Figure 1:
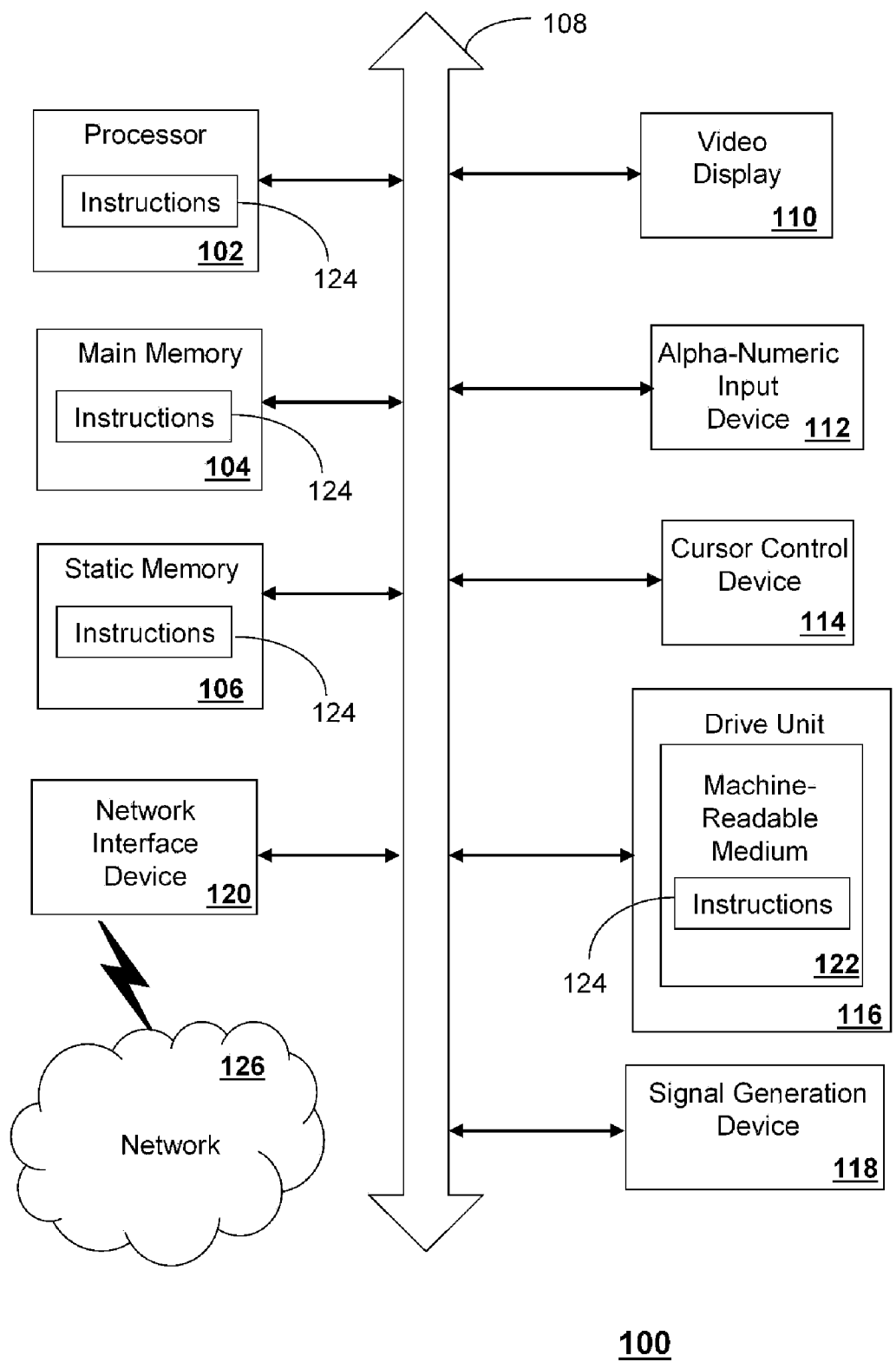
FIG. 1 is a block diagram of a computer system that is useful for understanding the invention.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The computer system 100 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 100 can include a processor 102 (such as a central processing unit (CPU), a graphics processing unit (GPU, or both), a main memory 104 and a static memory 106, which communicate with each other via a bus 108. The computer system 100 can further include a display unit 110, such as a video display (e.g., a liquid crystal display or LCD), a flat panel, a solid state display, or a cathode ray tube (CRT)). The computer system 100 can include an input device 112 (e.g., a keyboard), a cursor control device 114 (e.g., a mouse), a disk drive unit 116, a signal generation device 118 (e.g., a speaker or remote control) and a network interface device 120.

The disk drive unit 116 can include a computer-readable storage medium 122 on which is stored one or more sets of instructions 124 (e.g., software code) configured to implement one or more of the methodologies, procedures, or functions described herein. The instructions 124 can also reside, completely or at least partially, within the main memory 104, the static memory 106, and/or within the processor 102 during execution thereof by the computer system 100. The main memory 104 and the processor 102 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

In the various embodiments of the present invention, a computer-readable storage medium containing instructions 124 or that receives and executes instructions 124 from a propagated signal so that a device connected to a network environment 126 can send or receive voice and/or video data, and that can communicate over the network 126 using the instructions 124. The instructions 124 can further be transmitted or received over a network 126 via the network interface device 120.

While the computer-readable storage medium 122 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Figure 2A:
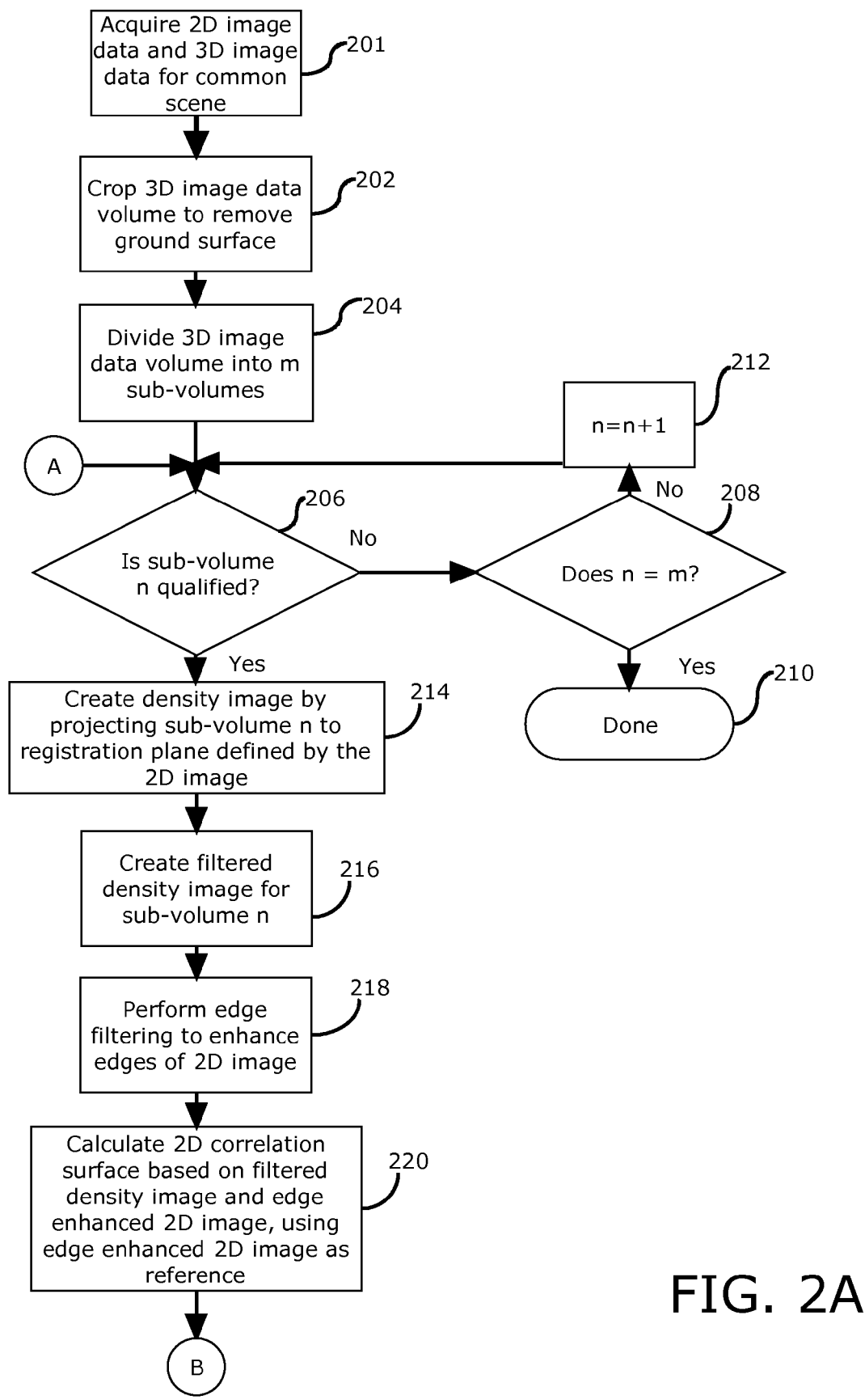
FIG. 2 is a flowchart that is useful for understanding the invention.
Figure 2B:
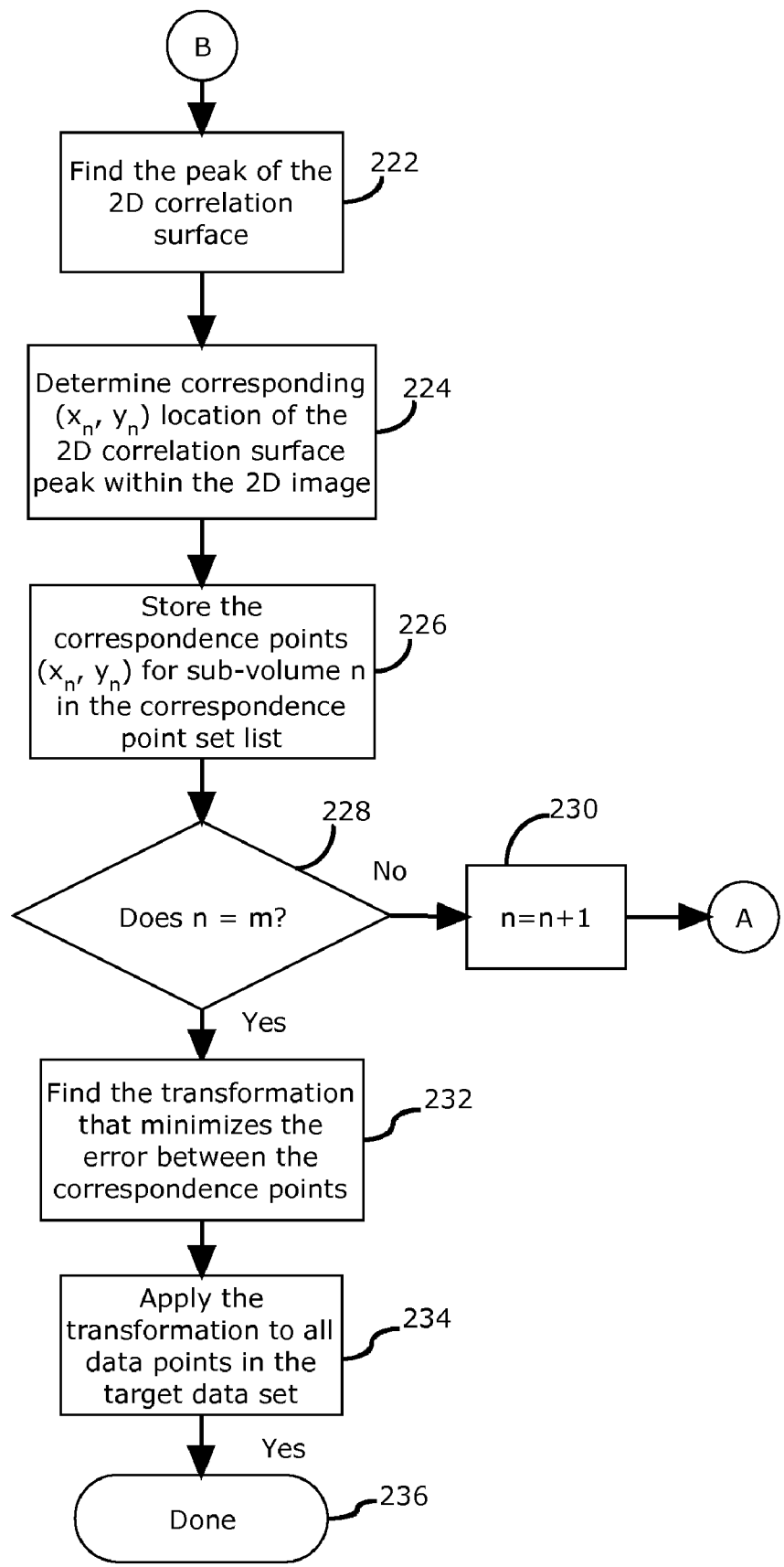
Figure 3:
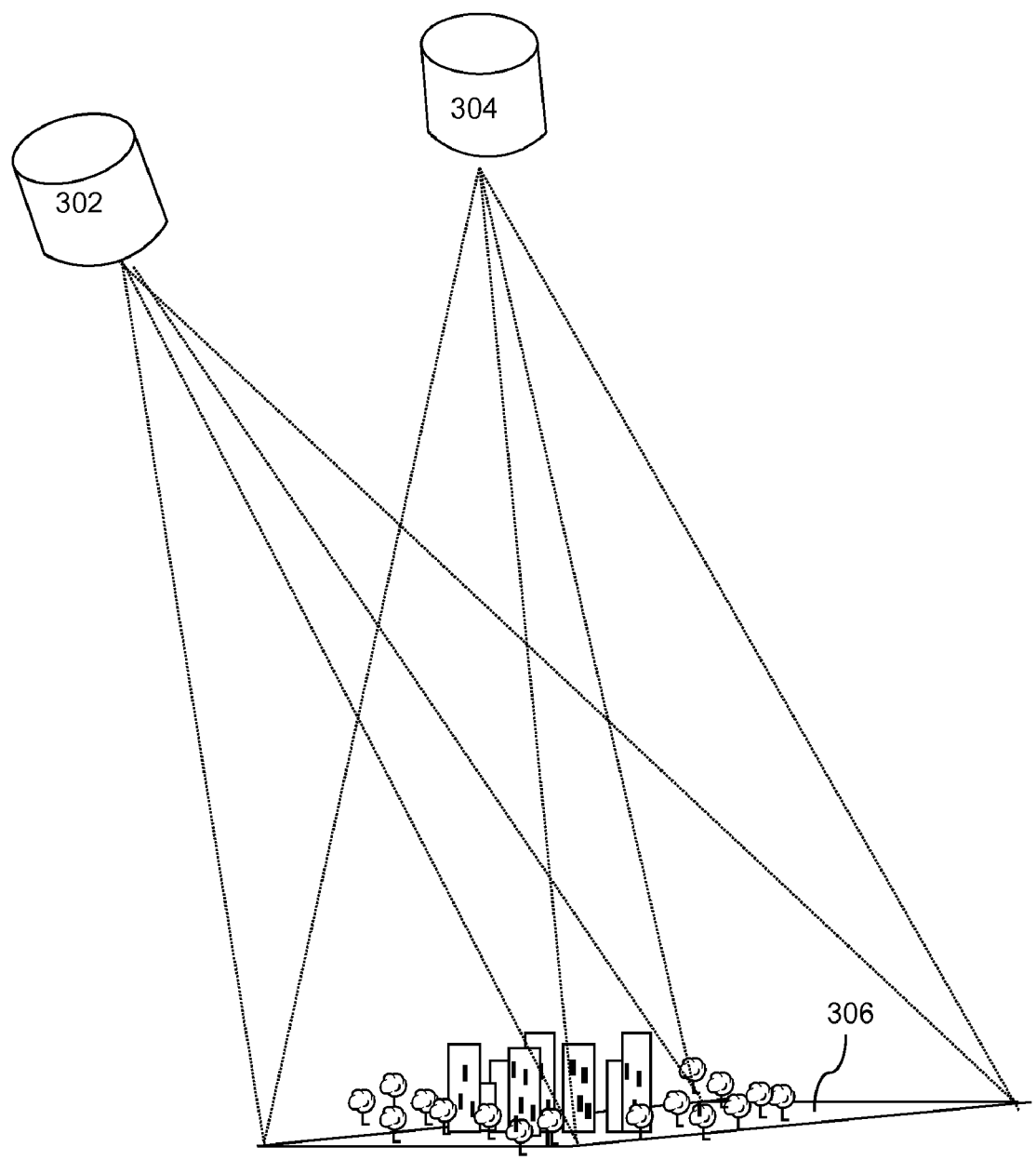
FIG. 3 is diagram that is useful for understanding how image data is acquired from different vantage points.

Those skilled in the art will appreciate that the computer system architecture illustrated in FIG. 1 is one possible example of a computer system. However, the invention is not limited in this regard and any other suitable computer system architecture can also be used without limitation Registration of 3D Point Cloud to 2D Electro-Optical Data Referring now to FIG. 2, a flowchart is provided. The flowchart is useful for understanding a method for registration of a three-dimensional (3D) image data comprising a point cloud, to a two-dimensional (2D) image data. The method begins in step 201 with the acquisition of 2D image data and 3D image data for a common scene. An example of such an acquisition process is shown in FIG. 3, wherein a first and second imaging sensor 302, 304 each acquires image data of a common scene 306. Although two imaging sensors are shown in FIG. 3, it should be understood that the invention is not so limited. Instead, a common sensor can be used at two different times. Significantly, in FIG. 3, first satellite 302 can be configured to collect 2D image data and second sensor 304 can be configured to collect 3D point cloud image data.

The two dimensional image data as described herein can be collected by any suitable imaging sensor as would be known to one of ordinary skill in the art. For example, earth-orbiting satellites and airborne data collection platforms commonly collect the 2D image data using electro-optical (EO) sensors. The term "electro-optical sensor" as used herein generally refers to any one of a wide variety of devices in which an optical system is used for imaging radiation from a scene onto the image sensing surface of an imaging device for a selected sample period. The imaging device may take the form of a two dimensional array of photo-responsive areas. A variety of semiconductor based imaging devices are known in the art. For example, charge coupled devices (CCDs) and photodiode arrays are often used for this purpose, without limitation. Still, it should be understood that the foregoing imaging devices are identified merely by way of example, and the invention is not intended to be limited to any particular EO type imaging device. For example, the invention can also be used for registration of medical images.

A variety of different types of imaging sensors can be used to generate 3D imaging data, and more particularly, 3D point cloud data. The present invention can be utilized for registration of 3D point cloud data obtained from any of these various types of imaging systems. One example of a 3D imaging system that generates one or more frames of 3D point cloud data is a conventional LIDAR imaging system. Each image frame of LIDAR data will be comprised of a collection of points in three dimensions (3D point cloud) which correspond to the multiple range echoes. These points can be organized into "voxels" which represent values on a regular grid in three dimensional space. Voxels used in 3D imaging are analogous to pixels used to in the context of 2D imaging devices. These frames can be processed to reconstruct a 3D image of a target. In this regard, it should be understood that each point in the 3D point cloud has an individual x, y and z value, representing the actual surface within the scene in 3D.

Figure 4:
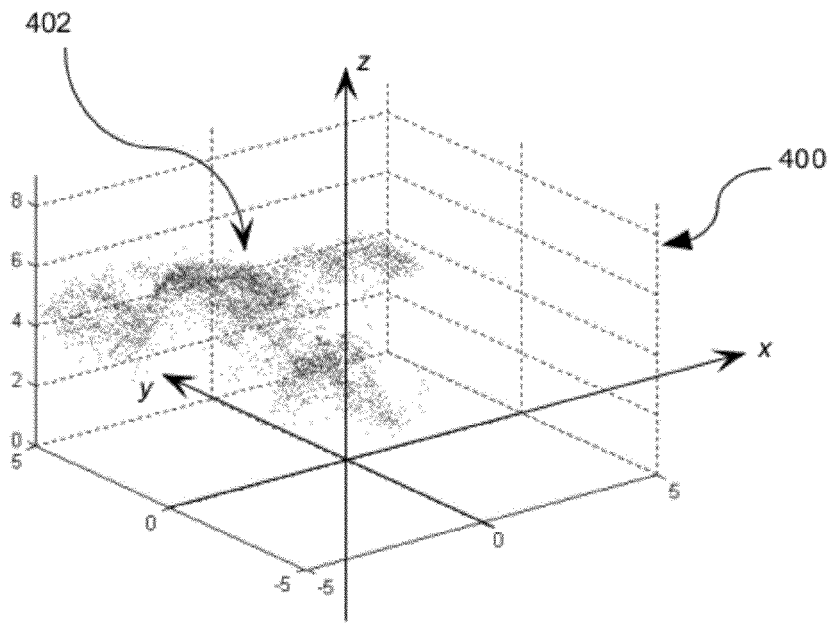
FIG. 4 is a drawing which is useful for understanding three-dimensional image data or point cloud data.
Figure 5:
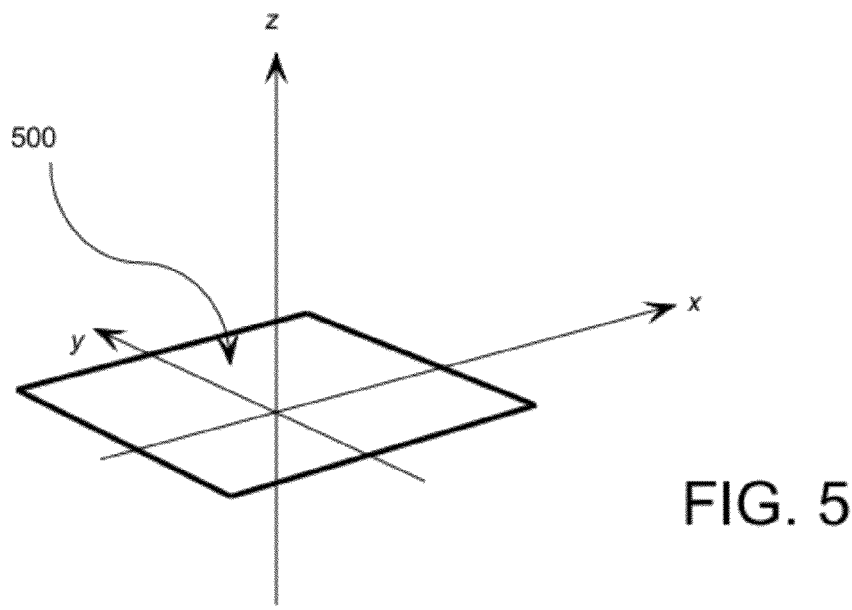
FIG. 5 is a drawing that is useful for understanding two-dimensional image data.

An exemplary cube 400 of 3D image data is shown in FIG. 4, whereas a frame of 2D image data is shown in FIG. 5. Note that the frame of 2D image data 500 is defined in a single plane whereas the cube 400 of 3D image data comprises a point cloud 402 which is defined in three dimensions. Further, it should be noted that although the exemplary 3D image data in FIG. 4 is shown to be delimited as a cube, the invention is not limited in this regard. Although it will be appreciated that a cube can be a convenient shape to use for this purpose, the 3D data can be defined within any other suitable geometric volume. For example, in place of a cube, a rectangular prism can also be used to delimit a 3D point cloud data set. Notwithstanding the foregoing, for purposes of convenience, the invention will be described in the context of a cube of point cloud data.

Referring once again to FIG. 3, it will be appreciated that the imaging sensors(s) 302, 304, can have respectively different locations and orientation. Those skilled in the art will appreciate that the location and orientation of the sensors is sometimes referred to as the pose of such sensors. For example, the sensor 302 can be said to have a pose that is defined by pose parameters at the moment that the 3D image data is acquired.

Figure 6:
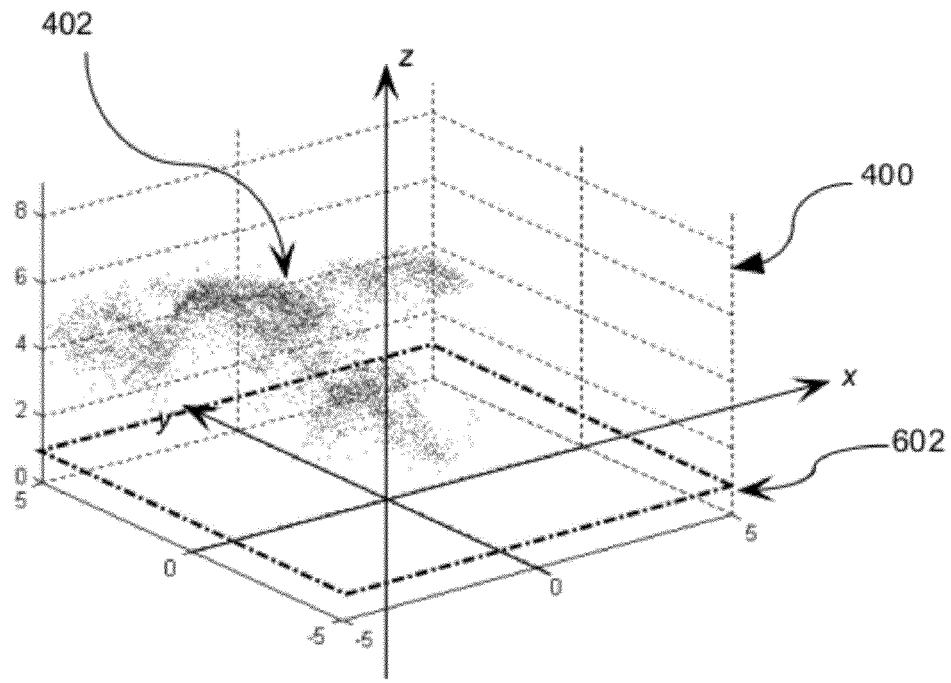
FIG. 6 is drawing which is useful for understanding how three-dimensional image data is cropped to remove a ground surface.

Referring once again to FIG. 2, the registration process can continue in step 202. In step 202, a portion of the cube 400 of 3D point data is cropped. More particularly, the cropping process removes a portion of the point cloud data corresponding to base surface reflections. When the invention is applied in the context of earth imaging, the base surface will generally be the ground surface. However, the invention is not limited in this regard. This process is illustrated conceptually in FIG. 6, wherein data falling below a plane 602 is systematically excluded from the image cube. In practice, the 3D point cloud data volume is systematically divided into regions. Then the 3D point data for each region is statistically analyzed to detect the ground contour. The ground contour for a particular region is regarded as the cropping plane for that region. Hence all 3D points within the region below this plane are discarded.

Figure 7:
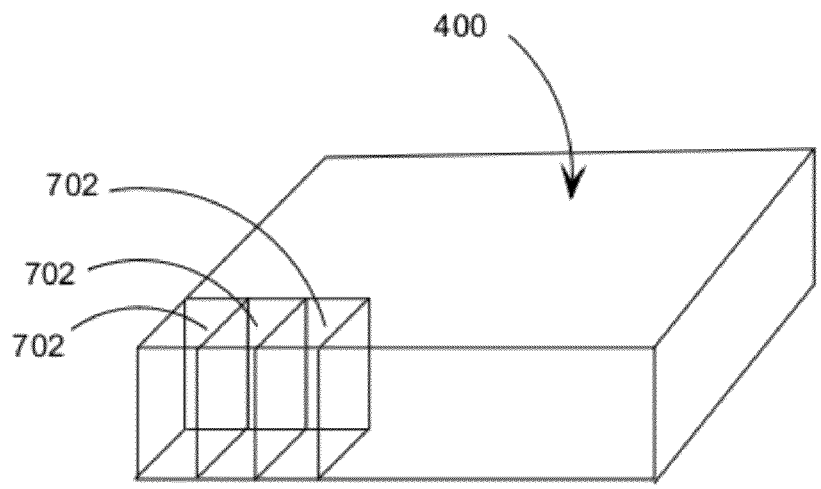
FIG. 7 is a drawing that is useful for understanding how the three-dimensional image data in FIG. 6 is divided into sub-volumes.

Following step 202, the method continues with step 204 in which the volume of 3D point data is divided into m sub-volumes. This sub-dividing step is illustrated in FIG. 7, which shows cube 400 being sub-divided into a plurality of m sub-volumes 702. Each of the m sub-volumes can also be cube shaped and in this respect can be though of as sub-cubes. Still, the invention is not limited in this regard, and other sub-volume shapes are also possible. Following step 204, an iterative process is performed in step 206-230 involving the m sub-volumes 702. The iterative process is described below.

The iterative process begins in step 206 in which a test is applied to determine if a sub-volume is qualified for further processing. Various criteria can be used for purposes of this test to determine if a particular sub-volume is qualified. For example, it can be advantageous to limit qualifying sub-volumes to those that include a sufficient amount of data or content. For example, qualifying sub-volumes can be limited to those with at least a predetermined number of data points contained therein. Another criteria for a qualifying subregion could be a subregion in which the data has a blob-like structure. A blob-like point cloud can be understood to be a three dimensional ball or mass having an amorphous shape. Accordingly, blob-like point clouds as referred to herein generally do not include point clouds which form a straight line, a curved line, or a plane. In step 206, if it is determined that a sub-volume is not qualified, then the process continues with step 208 in which it is determined whether all m sub-volumes have been evaluated. If so, the process terminates in step 210; otherwise, the iteration values is increased and the process returns to step 206 to evaluate the next sub-volume 702. If in step 206 a sub-volume is determined to be qualified, then the process continues on to step 214.

Figure 11:
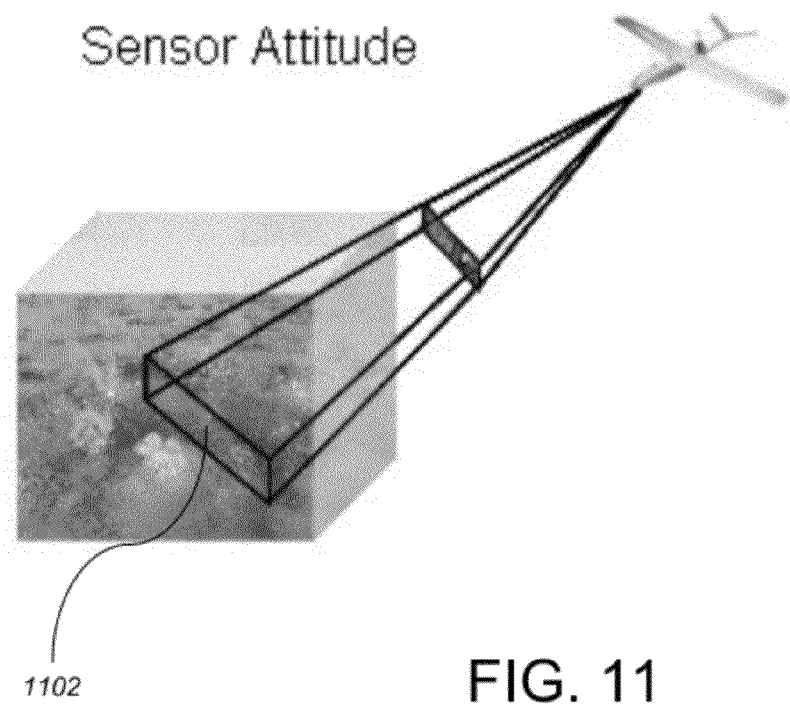
FIG. 11 is a drawing that is useful for understanding how the pose of an EO sensor defines a registration plane used to register the EO and 3D point cloud data.

In step 214, a density image is created by using a sub-volume. More particularly, the current sub-volume under evaluation is projected to a registration plane defined by the 2D EO image. The attitude data from the EO sensor is used to determine what this plane is. FIG. 11 is an example of the EO sensor attitude and the corresponding plane 1102 that would be used to register the EO and 3D point cloud data. The 3D point cloud data would be projected to this plane 1102 before making the filtered density image. A simple example is given in FIGS. 4 and 5. The example provided is for the case where the 2D EO sensor attitude is nadir and thus the registration plane is simply the x, y plane. It will be appreciated that in the more general case where the 2D EO sensor attitude is not nadir, the registration plane 1102 would be defined by some other x', y' plane. For simplicity of explanation, the invention will be described as though the registration is simply the x, y plane. However, it should be understood that the invention is not limited in this regard. Instead, for those instances exemplified by FIG. 11, where the 2D EO sensor is not nadir, the references to x, y plane herein would be replaced by a different reference plane defined by some other coordinate axis system x', y'.

Referring again to FIGS. 4 and 5, it can be observed that the various data points within each sub-volume 702 that comprise the 3D point cloud are projected from their location within the point cloud onto the registration plane. In the simple case shown in FIGS. 4 and 5 where the registration plane is the x, y plane, the x and y values of the data points remain the same, while the z value for each of the data points is set to zero. In the more general case (EO sensor not nadir), the data points are projected to whatever registration plane x', y' (1102) has been defined. This means that each point comprising the point cloud is projected by mathematically adjusting their position along a line of sight normal to the registration plane until they are re-positioned on the registration plane. The result of step 214 is to convert each sub-volume 702 comprising the 3D point cloud data to a two-dimensional projection in the registration plane. This two-dimensional projection is used to create a density image. The purpose of the density image as described herein is to allow a subsequently applied filtering process to find edge content of the two-dimensional shapes that will be registered.

In step 216, the process continues by creating filtered density images for sub-volume 702. Creation of the filtered density image in step 216 actually involves at least three steps. Briefly, step 216 includes (1) forming a density image with the two-dimensional projection obtained in step 214, (2) performing median filtering of the density image, and (3) performing edge filtering of the median filtered density images. The density image is formed by applying a regular grid to the two-dimensional projection in step 214 so as to divide the two-dimension projection into a plurality of regular grid regions. The number of points contained within each individual grid region is evaluated, and that numerical value is assigned to that grid region. The dimension of each individual grid region is chosen to correspond with the resolution (sometimes referred to as ground sample distance or GSD) of the EO image. One way of visualizing the density image is to think of it as simulated panchromatic imagery. Filtering steps (2) and (3) will now be described in greater detail.

The median filter step is performed primarily to reduce noise in the density image. Median filters are well known in the art. Median filtering generally involves selection of a filter mask that is a certain number of pixels in length and width. The exact size of the mask can vary according to the particular application. In the present case, a filter mask having a size of 5 pixels long×5 pixels wide has been found to provide suitable results. However, the invention is not limited in this regard. In practice, the mask is convolved with the image. Accordingly, the median filter will replace the center pixel value with the median of the remaining pixels values under the mask. The median is calculated by first sorting all the pixel values under the mask into numerical order and then replacing the pixel being considered with the middle pixel value.

The edge filtering step will now be described in further detail. Those skilled in the image processing field will readily appreciate that for the purpose of aligning two images, it can be helpful to identify the edges of objects contained in the image. For example, detecting the edges of objects forming an image will substantially reduce the total amount of data contained in the image. Edge detection preserves the important structural properties of an image but will remove information which is not generally useful for purposes of image alignment. Accordingly, it is advantageous to perform edge filtering on the density images after median filtering has been performed.

As used herein, the term "edge" generally refers to areas within a two-dimensional image where there exist strong intensity contrasts. In such areas, there is usually a rapid variation in intensity as between adjacent pixels. In this regard, it should be understood that while there are many different ways to perform edge detection, and all such methods are intended to be included within the scope of the present invention. For the purpose of the present invention, edge filtering can include any technique now known, or which is discovered in the future, which can be used for detecting or emphasizing edges within an image.

According to one embodiment, edge filtering in the present invention can be carried out using a conventional Sobel filter. In a Sobel filtering process, a Sobel operator is used to determine a 2-D spatial gradient measurement on an image. Conventional techniques for Sobel filter processing are well known. Accordingly, the Sobel filtering technique will not be described here in great detail. Typically, however, a first convolution mask is used for determining a gradient in the x-direction. For example, the first convolution mask can be 3 pixels in length and 3 pixels wide. A second convolution mask of the same size is used for determining a gradient in the y-direction. In this regard, it should be understood that each of the first and second convolution masks will be much smaller than the actual density image. The masks are each slid over the image, manipulating one 3×3 group of pixels at a time in accordance with the Sobel operator. The first convolution mask highlights the edges in a first direction while the second convolution mask highlights the edges in a second direction, transverse to the first direction. As used herein, the term "highlight" can refer to any image or data enhancement that allows edges within point clouds to be more clearly defined. The result of the process is edges that are highlighted in directions aligned with both the x and y axis.

In step 218 the 2D image 500 is also filtered to enhance the edges of the 2D image. This edge filtering can be performed using any suitable edge filtering technique. For example, a Sobel filtering process can be used for this purpose in a manner similar to that described above with respect to step 216. Still, the invention is not limited in this regard, and other suitable edge filters can be used for this purpose as will be understood by one skilled in the art.

Figures 8, 10:
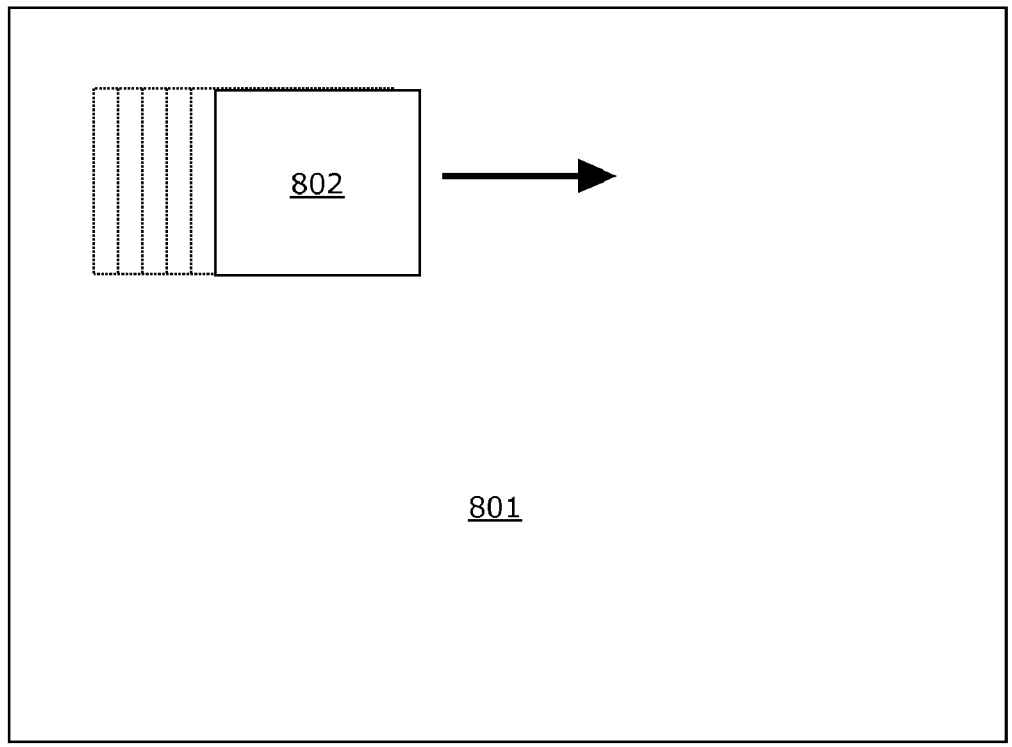
FIG. 8 is a drawing that is useful for understanding how a two-dimensional correlation surface is computed using a filtered density image and an edge-enhanced two-dimensional image.
FIG. 10 is a drawing that is useful for understanding a correspondence point set list.
Figure 9:
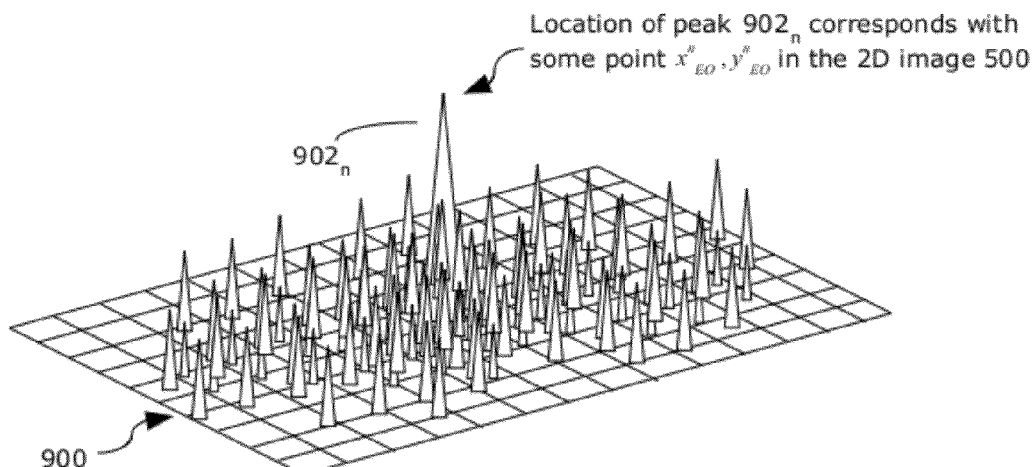
FIG. 9 is a conceptual drawing which is useful for understanding how a two-dimensional correlation surface is used in the present invention.

In step 220, a two-dimensional correlation surface is created based on the region of the filtered density image and a corresponding region of the edge enhanced 2D image. This process is illustrated in FIG. 8, wherein it is shown that filtered density image 802 for a particular sub-volume 702$_n$ is moved one pixel at a time and at each position is correlated with the edge enhanced 2D EO image 801 to obtain a correlation value. These values are then plotted as shown in FIG. 9, which conceptually illustrates a two-dimensional correlation plot 900$_n$. It is well known in the art that the cross-correlation of two images is a standard approach which can be used for identifying similarities as between two images. If two images contain at least some common subject matter, the cross-correlation process will generally result in a peak in the correlation value at a location which corresponds to the actual x, y translation error.

Referring to FIGS. 8 and 9, the peak of the cross-correlation surface plot occurs where the filtered density image 802$_n$ is best correlated with the edge enhanced 2D EO image 801. Significantly, the correlation peak location will identify a shift in the registration planeas between the filtered density image 802$_n$ and the 2D EO image. In the simple scenario shown in FIGS. 5 and 6, this shift would be the x, y plane. More generally, the correlation peak location will identify a shift in the x', y' plane, where x', y' represents the registration plane 1102 shown in FIG. 11. For purposes of performing this correlation process, the 2D EO image is used as the reference frame, whereas the filtered density image is used as a target frame. However, the reference and target could be interchanged based on the expected error in each. Typically, the one with the smallest absolute error is considered the reference. Absolute error is the true error or error between the data coordinates and ground truth locations for those points.

The correlation process described herein with respect to step 220 can be performed using a normalized cross-correlation (NCC) process. The use of NCC processes for registration of two dimensional images is well known in the art. Accordingly, the NCC process will not be described here in detail. In general, however, the cross-correlation of two images i and j is defined as the product:

$$\sum_{p_i \in w_i} \sum_{p_j \in w_j} p_i \otimes p_j$$

where $p_i$ is the pixel index running over the domain of interest $w_i$ in the filtered density image i, and similarly $p_j$ is a running 2-dimensional index over the domain of interest $w_j$ in the edge enhanced 2D image j. It is known in the art that the cross-correlation product denoted as $\otimes$ can be defined by various different functions, depending on the purpose of the cross-correlation. However, one example of typical product definition would be as follows:

$$p_i \otimes p_j = \sum_{w_i, w_j} (p_i p_j)$$

It will be appreciated by those skilled in the art that the foregoing product definition will provide an indication how similar are two regions of interest contained in two different images. In this regard, the cross correlation value is at a peak where the best correlation is obtained. Of course, the invention is not limited in this regard and any other correlation process can be used provided that it produces a result which identifies a translation error as between the density image for a particular sub-volume 702$_n$ and the 2D image.

After the 2D correlation surface for sub-volume 702$_n$ has been created in step 220, the process continues on to step 222. In step 222, the maximum peak 902$_n$ of the 2D correlation surface is identified. The location of peak 902$_n$ will correspond with some location in the 2D image 500 which is defined by point $(x_{EO}{}^n, y_{EO}{}^n)$. Accordingly, in step 224, point $(x_{EO}{}^n, y_{EO}{}^n)$ in the 2D image 500 is identified based on the location of the maximum correlation peak value. As a result of the process by which the correlation surface is formed, there exists a direct mapping of each pixel in the correlation surface to the 2D image In step 226, the values for point $(x_{EO}{}^n, y_{EO}{}^n)$ are stored in a correspondence point set list. An example of a point set list is shown in FIG. 10. As illustrated therein, the $(x_{EO}{}^n, y_{EO}{}^n)$ values are stored together with corresponding $(x_{Lidar}{}^n, y_{Lidar}{}^n)$ location values. The $(x_{Lidar}{}^n, y_{Lidar}{}^n)$ location values represent the centers of the filtered density image 802$_n$ within a larger volume or cube 400 of 3D image data. Note that the z component is not needed for purposes of the correspondence point sets because this variable was removed when the projection to the common x, y registration plane occurred. The actual error between the two data sets is determined by taking the correspondence points between the data sets and minimizing the distance between them using an optimization routine (such as least squares) which includes a cost function. The cost function can include any of the following including combinations of them: translation, scale, skew, rotation, polynomial, as well as various other non-linear methods known by those in the field.

Following step 226 a determination is made in step 228 as to whether all m sub-volumes or sub-cubes have been processed in steps 206-226. If not, then the value of n is incremented in step 230 and the process returns to step 206, where the next sub-volume is evaluated and processed as previously described. When all of the sub-volumes $702_n$ have been evaluated and processed, the method continues on to step 232.

As explained with regard to step 226, the $(x_{EO}{}'', y_{EO}{}'')$ values and corresponding $(x_{Lidar}{}'', y_{Lidar}{}'')$ are referred to as correspondence pairs and these location values are stored in the point set list. In step 232, an optimization technique is used, to find a transformation relationship between the two point sets. This transformation is defined once the optimization technique attains the smallest distance between correspondences that minimizes a cost function. In one embodiment of the invention, the least squares error function is used as the optimization technique. However, it should be understood that the invention is not limited in this regard. As will be appreciated by one skilled in the art, any suitable method can be used to identify the optimal transformation solution once the correspondence pairs have been identified. There are several optimization routines which are well known in the art that can be used to minimize the error between the correspondence points. For example, the optimization routine can involve a simultaneous perturbation stochastic approximation (SPSA). Other optimization methods which can be used include the Nelder Mead Simplex method, the Least-Squares Fit method, and the Quasi-Newton method. Each of these optimization techniques are known in the art and therefore will not be discussed here in detail Once the optimal transformation has been determined in step 232, the method continues on to step 234. In step 234, the transformation is applied to all data points in the 3D point cloud data. Applying the optimal transformation to the 3D point cloud theoretically aligns the 3D point cloud data with the 2D image. The result is that the three-dimensional image data set is registered with the two-dimensional image data set.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for registration of a plurality of images, comprising:
    acquiring for a common scene a two dimensional image data and a three-dimensional image data;
    cropping a three-dimensional volume of point cloud data comprising said three-dimensional image data to remove a portion of said point cloud data comprising a ground surface within said scene;
    dividing said three-dimensional volume into a plurality of m sub-volumes, where m is greater than or equal to one;
    edge-enhancing said two-dimensional image data;
    for each qualifying sub-volume, creating a filtered density image, calculating a two-dimensional correlation surface based on said filtered density image and said two-dimensional image data that has been edge enhanced, finding a peak of the two-dimensional correlation surface, determining a corresponding location of said peak within the two-dimensional image, define a correspondence point set; and storing said correspondence point set in a point set list;
    finding a transformation that minimizes the error between a plurality of said correspondence point sets contained in said point set list; and
    applying the transformation to said points in a target data selected from group consisting of the three-dimensional image data and said two-dimensional image data.

2. The method according to claim 1, wherein said qualifying sub-volume is identified based on one or more selected characteristics associated with a particular sub-volume n selected from the group consisting of a predetermined number of data points therein, and the presence of a blob-like structure therein.

3. The method according to claim 1, wherein said step of creating a filtered density image comprises projecting said point cloud data within a sub-volume n to a registration plane defined by a two-dimensional image data sensor attitude to form a density image.

4. The method according to claim 3, wherein said step of creating said filtered density image further comprises median filtering said density image.

5. The method according to claim 4, wherein said step of creating said filtered density image further comprises edge filtering said density image to enhance at least one edge in said density image.

6. The method according to claim 5, wherein said edge filtering method is selected to be a Sobel edge filter.

7. The method according to claim 1, wherein said step of calculating a two-dimensional correlation surface includes using either said two-dimensional image as a reference image, and said filtered density image as a target image, or said filtered density image as a reference image and said two-dimensional image as a target image.

8. The method according to claim 1, further comprising acquiring said point cloud data using a LIDAR sensor.

9. The method according to claim 1, further comprising acquiring said two-dimensional image data using an electro-optical sensor.

10. The method according to claim 1, wherein said step of calculating said two-dimensional correlation surface further comprises performing a normalized cross-correlation.

11. A system for registration of a plurality of images, comprising processing means programmed with a set of instructions for performing a series of steps including:
    cropping a three-dimensional volume of point cloud data comprising a three-dimensional image data to remove a portion of said point cloud data comprising a ground surface within a scene;
    dividing said three-dimensional volume into a plurality of m sub-volumes, where m is greater than or equal to one;
    edge-enhancing a two-dimensional image data;
    for each qualifying sub-volume, creating a filtered density image, calculating a two-dimensional correlation surface based on said filtered density image and said two-dimensional image data that has been edge enhanced, finding a peak of the two-dimensional correlation surface, determining a corresponding location of said peak within the two-dimensional image, defining a correspondence point set; and storing said correspondence point set in a point set list;
    finding a transformation that minimizes the error between a plurality of said correspondence point sets contained in said point set list; and applying the transformation to said points in a target data selected from group consisting of the three-dimensional image data and said two-dimensional image data.

12. The system according to claim 11, wherein said qualifying sub-volume is identified based on one or more selected characteristics associated with a particular sub-volume n selected from the group consisting of a predetermined number of data points therein, and the presence of a blob-like structure therein.

13. The system according to claim 11, wherein said step of creating a filtered density image comprises projecting said point cloud data within a sub-volume n to a registration plane defined by a two-dimensional image data sensor attitude to form a density image.

14. The system according to claim 13, wherein said step of creating said filtered density image further comprises median filtering said density image.

15. The system according to claim 14, wherein said step of creating said filtered density image further comprises edge filtering said density image to enhance at least one edge in said density image.

16. The system according to claim 15, wherein said edge filtering system is selected to be a Sobel edge filter.

17. The system according to claim 11, wherein said step of calculating a two-dimensional correlation surface includes using either said two-dimensional image as a reference image, and said filtered density image as a target image, or said filtered density image as a reference image and said two-dimensional image as a target image.

18. The system according to claim 11, further comprising acquiring said point cloud data using a LIDAR sensor.

19. The system according to claim 11, further comprising acquiring said two-dimensional image data using an electro-optical sensor.

20. The system according to claim 11, wherein said step of calculating said two-dimensional correlation surface further comprises performing a normalized cross-correlation.

21. A computer program embodied on a non-transitory computer-readable medium for performing a series of steps comprising:
cropping a three-dimensional volume of point cloud data comprising a three-dimensional image data to remove a portion of said point cloud data comprising a ground surface within a scene;
dividing said three-dimensional volume into a plurality of m sub-volumes, where m is greater than or equal to one;
edge-enhancing said two-dimensional image data;
for each qualifying sub-volume, creating a filtered density image, calculating a two-dimensional correlation surface based on said filtered density image and said two-dimensional image data that has been edge enhanced, finding a peak of the two-dimensional correlation surface, determining a corresponding location of said peak within the two-dimensional image, define a correspondence point set; and storing said correspondence point set in a point set list;
finding a transformation that minimizes the error between a plurality of said correspondence point sets contained in said point set list; and
applying the transformation to said points in a target data selected from group consisting of the three-dimensional image data and said two-dimensional image data.

* * * * *